C. E. LACY.
AUTOMOBILE PEDAL LOCK.
APPLICATION FILED SEPT. 25, 1919.
1,343,459.
Patented June 15, 1920.
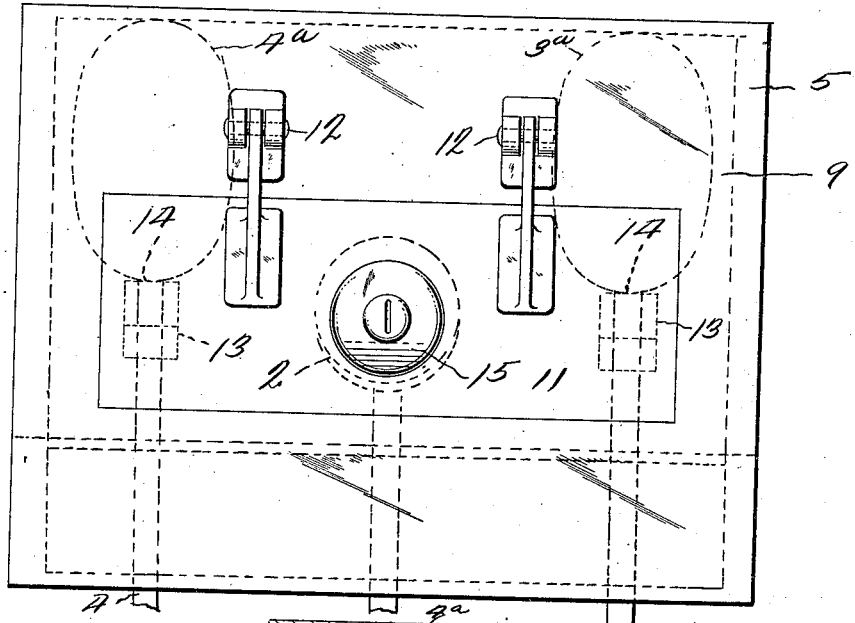
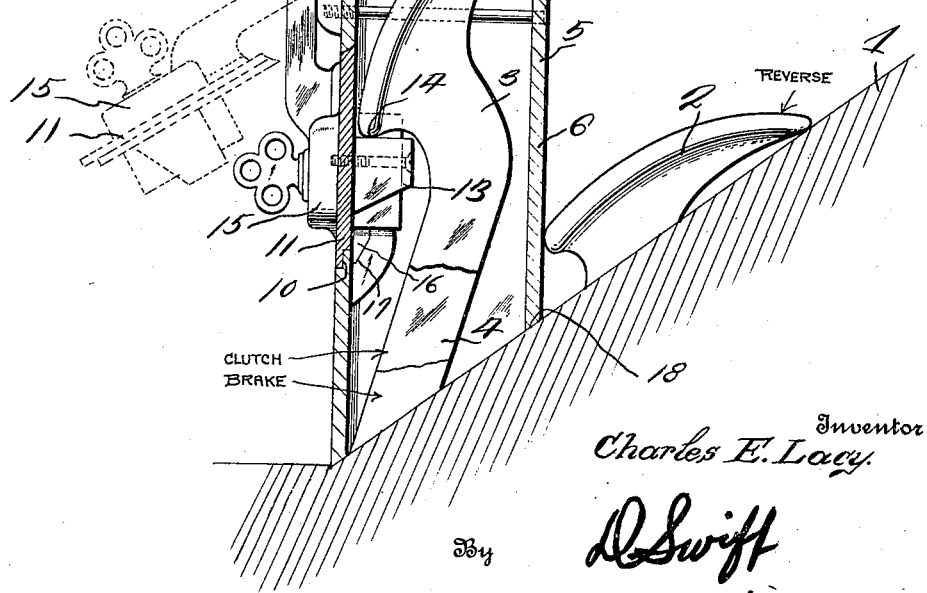
Inventor
Charles E. Lacy.
By D. Swift
Attorney

UNITED STATES PATENT OFFICE.

CHARLES EARL LACY, OF RICHMOND, VIRGINIA.

AUTOMOBILE-PEDAL LOCK.

1,343,459.　　　　　　Specification of Letters Patent.　　Patented June 15, 1920.

Application filed September 25, 1919.  Serial No. 326,182.

*To all whom it may concern:*

Be it known that I, CHARLES E. LACY, a citizen of the United States, residing at Richmond, in the county of Henrico, State of Virginia, have invented a new and useful Automobile-Pedal Lock; and I do hereby declare the following to be a full, clear, and exact description of the invention, such as will enable others skilled in the art to which it appertains to make and use the same.

The invention relates to pedal locks for locking the pedals for controlling the clutch, brake, and reverse pedals of an internal combustion engine of the type used on motor driven vehicles, and has for its object to provide a housing adapted to be disposed over the clutch and brake pedals, said housing having its forward face so disposed as to engage and hold in forward position the reverse pedal. Also to provide a door hingedly connected to one side of the casing and provided with lugs at either side thereof adapted to engage under the lower edges of the trade portion of the clutch and brake pedals when said door is closed, thereby preventing the movement of the casing and pedals when said lugs are in engagement with the pedals and the door locked.

A further object is to provide and so construct the casing so that its upper chambered end will engage the upper ends of the clutch and brake lever when the casing is in position and the door carried lugs are in engagement with the pedals thereby preventing movement of the casing as a whole and the operation of the levers.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the casing.

Fig. 2 is a sectional view through the casing showing the clutch and brake pedals locked therein and the reverse pedal locked in forward position.

Referring to the drawings, the numeral 1 designates the inclined portion of the bottom of an automobile body and 2 the reverse pedal which controls the reverse mechanism of the engine. Said reverse pedal when in forward position as shown in Fig. 2 preventing the forward movement of the vehicle, therefore if the vehicle should be moved it could only be moved in a rearward direction. Pedals 3 and 4 control the brake and the clutch of the engine therefore by preventing the movement of pedals 3 and 4 and the reverse pedal 2, the operation of the engine will be prevented. To lock these various pedals in the position shown in Fig. 2, a housing 5 is provided. Housing 5 is placed over pedals 3 and 4 after the reverse pedal 2 has been forced forwardly. The wall 6 of the housing preventing the rearward movement of the reverse pedal 2 when the pedals 3 and 4 are within the chamber 7 of the housing 5. Pedals 3 and 4 are provided with treads 3ª and 4ª, the upper ends of which are adapted to engage the upper wall 8 of the housing. The wall 9 of the housing is provided with an opening 10 which is normally closed by a door 11, said door being hingedly connected as at 12 to the wall 9. Opening 10 is preferably formed with overlapping portions adapted to be overlapped by portions of the door 11 thereby preventing the forcing of a tool between the door edges and the opening edges for forcing the door open. The inner face of the door 11 is provided with lugs 13, which when the door is closed engage under the lower ends of the treads 3ª and 4ª as at 14, thereby holding the tread portions in the upper end of the chamber 7 of the housing and at the same time preventing the removal of the housing from over the pedals 3 and 4 and also preventing the rearward movement of the reverse pedal 2.

The door 11 is provided with a lock 15 by means of which lock a latch 16 may be thrown into and out of engagement with a keeper 17 carried by the inner wall of the wall 9 of the casing thereby securely locking the door and the pedals 3 and 4 within the chamber of the casing. The lower end 18 of the casing which is inclined at an angle to correspond with the inclined portion 1 of the flooring of the automobile body will prevent the casing as a whole from being moved, said inclined portion being held in engagement with the portion 1 by means of the lugs 13 carried by the door 11.

When it is desired to lock the pedals, the reverse pedal 2 is forced forwardly then the casing 5 is placed over the pedals 3 and 4, after which the door 11 is closed thereby placing the lugs 13 under the ends 14 of the pedals and securely locking the pedals within the casing 5, which will prevent unauthorized persons from manipulating the pedals as to operate the machine.

From the above it will be seen that an automobile pedal locking mechanism is provided which may be easily and quickly applied to the pedals of an automobile and one wherein the locking of the pedals is positive and one wherein the construction is simple and the device as a whole may be constructed at a reasonable cost.

The invention having been set forth what is claimed as new and useful is:—

1. A pedal lock for motor driven vehicles comprising a housing, said housing being adapted to receive the clutch and brake pedals of a motor driven vehicle, said housing when in position over said clutch and brake pedals engaging the upper ends of said pedals, the lower end of said housing engaging the flooring of the body of the vehicle, one wall of said housing being adapted to engage and hold in forward position a reverse pedal, and means for engaging the clutch and brake pedals for securely holding said pedals within the housing.

2. A pedal lock for motor driven vehicles comprising a housing, said housing being adapted to receive clutch and brake pedals having tread portions at their upper ends, the upper ends of said pedals being in engagement with the upper end of the housing, the lower end of housing engaging the bottom of the vehicle body, one wall of said housing being provided with an aperture, a door pivoted to said last named wall and adapted to form a closure for the opening therein, lugs carried on the inner face of said door and adapted to engage under the lower ends of the clutch and brake pedal tread portions thereby locking the pedals in relation to each other and preventing the removal of the housing, and one wall of the housing being so positioned that when the housing is in position on the clutch and brake pedals said wall will hold the reverse pedal in forward position.

3. A pedal lock for motor driven vehicles comprising a housing, said housing being adapted to receive clutch and brake pedals having tread portions at their upper ends, the upper ends of said pedals being in engagement with the upper end of the housing, the lower end of the housing engaging the bottom of the vehicle body, one wall of said housing being provided with an opening, a door pivoted to said last named wall and adapted to form a closure for the opening therein, lugs carried on the inner face of said door and adapted to engage under the lower ends of the clutch and brake pedal tread portions thereby locking the pedals in relation to each other and preventing the removal of the housing, a wall of the housing being so positioned that when the housing is in position on the clutch and brake pedals said wall will hold the reverse pedal in forward position and locking means carried by the door whereby said door may be locked in the opening of the wall.

In testimony whereof I have signed my name to this specification in the presence of two subscribing witnesses.

CHARLES EARL LACY.

Witnesses:
C. WYNDHAM GALLOWAY,
LUCILLE AUERHEIN.